United States Patent [19]

Abrahamsson et al.

[11] Patent Number: 4,671,709
[45] Date of Patent: Jun. 9, 1987

[54] POT BROACH

[75] Inventors: Axel B. Abrahamsson; Eugene J. Bistrick, both of Warren; Harvey J. Yera, Richmond; Margaret Wieczorek, Mt. Clemens, all of Mich.

[73] Assignee: National Broach & Machine Company, Mt. Clemens, Mich.

[21] Appl. No.: 855,895

[22] Filed: Apr. 24, 1986

[51] Int. Cl.$^4$ .............................................. B23F 21/26
[52] U.S. Cl. ...................................... 407/16; 407/18; 407/19
[58] Field of Search .................................... 407/12–20, 407/27, 28

[56] References Cited

U.S. PATENT DOCUMENTS

| 1,713,390 | 5/1929 | Lundell | 407/18 |
| 2,209,025 | 7/1940 | Kaplan et al. | 407/18 |
| 2,210,109 | 8/1940 | West | 407/12 |
| 4,065,222 | 12/1977 | Bistrick et al. | 407/14 |

FOREIGN PATENT DOCUMENTS

| 403128 | 12/1933 | United Kingdom | 407/18 |
| 1395282 | 5/1975 | United Kingdom | 407/16 |

Primary Examiner—Nicholas P. Godici
Assistant Examiner—Jerry Kearns
Attorney, Agent, or Firm—Barnes, Kisselle, Raisch, Choate, Whittemore & Hulbert

[57] ABSTRACT

A tooth broach designed for use with thin workpieces having its teeth arranged in circumferentially extending sets in each of which the teeth are arranged in groups of one or more teeth, and gaps devoid of teeth between adjacent groups. The teeth are further arranged in longitudinally extending series, in which consecutive teeth in each series are separated by gaps in the adjacent sets. This provides for reduced axial spacing between axially adjacent sets of teeth to maintain cutting action at all times with a thin workpiece.

9 Claims, 7 Drawing Figures

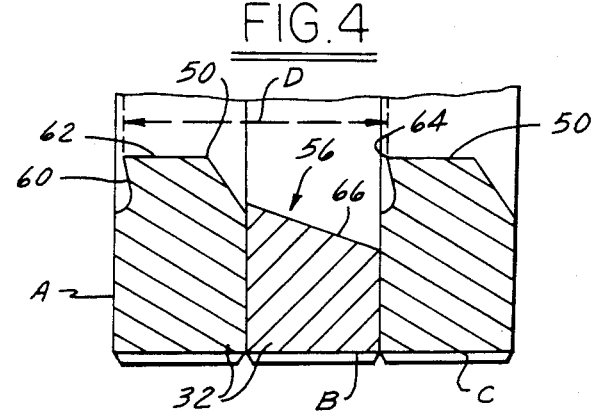
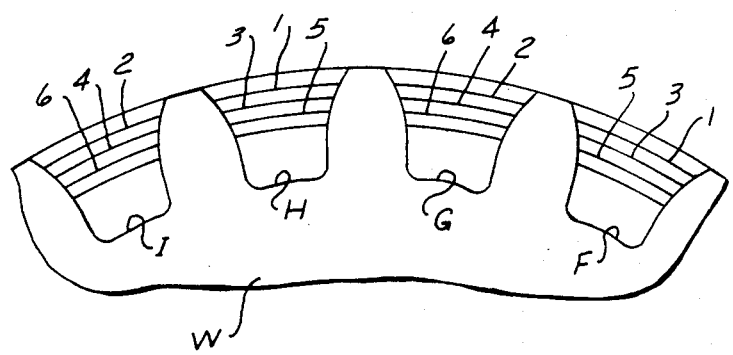
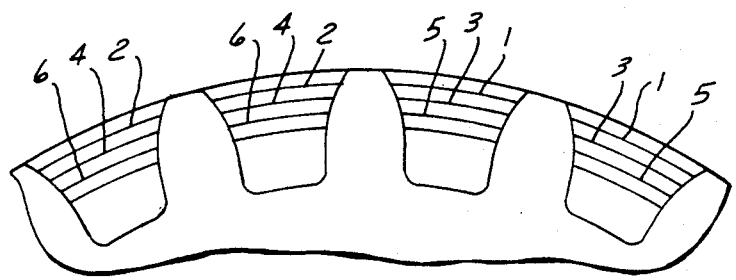
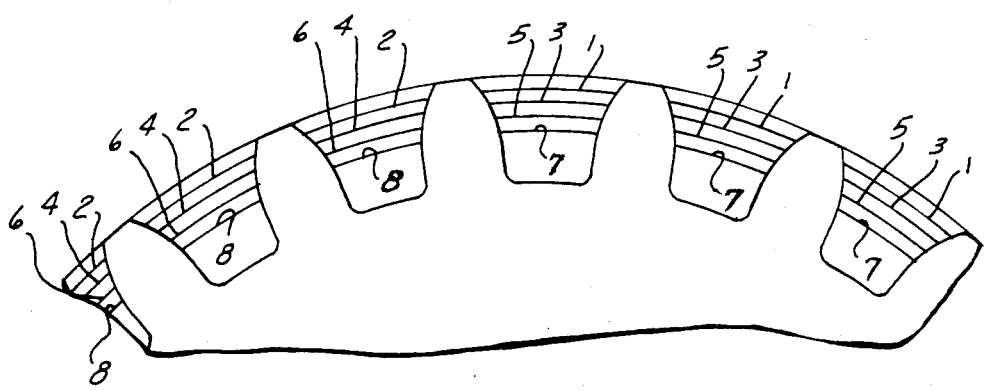

POT BROACH

BACKGROUND AND SUMMARY OF THE INVENTION

Broaching workpieces to cut a circular array of slots therein to provide teeth between adjacent slots is an efficient operation to produce accurate gears or splines, either internally or externally toothed. In the operation as known to the prior art, the cutting teeth of the broach were usually arranged in longitudinally extending series and in axially spaced, circumferentially extending sets.

The broach may be an internally toothed pot broach for cutting slots to form external teeth on the periphery of a circular workpiece. Alternatively, the tool may be an elongated externally tooth broach for cutting slots to form internal teeth in a generally circular array in an opening in a workpiece.

In either case, the teeth constituting a longitudinally extending series may be straight and parallel to the axis of the broach, to form spur teeth, or arranged in a helix to form helical teeth on the workpiece.

Also, in either case, the teeth in each longitudinally extending series are of progressively stepped height so as to take a series of cuts to form the corresponding slot.

It is an advantage of broaching that the workpiece is positioned laterally, at least in the final phase of the operation, by the broaching tool itself. This results in producing workpieces whose accuracy is determined essentially by the accuracy of the broach. Since each broach produces hundreds or thousands of workpieces, it is practical to form broaches with extreme accuracy, thus, producing gears of comparable accuracy.

This of course requires that at least some broach teeth preferably spaced more or less uniformly around the circular array of slots being cut, remain at all times in cutting contact with the workpiece.

In the case of relatively thick gears, this requirement presents no difficulty and each circular set or array of cutting teeth may provide a tooth for each of the slots to be cut. However, if the thickness of a workpiece is less than the axial spacing between adjacent sets of teeth, it will be apparent that there is an interval between the cutting and guiding action of successive sets of teeth when guiding action is lost. On the other hand, if the axial spacing between adjacent sets of teeth is reduced enough to maintain continuous cutting and guiding action, the space between teeth in each longitudinal series may not be sufficient for adequate chip clearance.

In accordance with the present invention, each circumferentially extending set of teeth (formed on a separate ring in the specific embodiment disclosed) comprises alternated groups of teeth having one or more teeth therein, and gaps between adjacent groups of teeth, which gaps are devoid of teeth. In adjacent rings or sets of teeth, a group of teeth is in longitudinal alignment with a gap.

With this arrangement, axial spacing between adjacent rings or sets of teeth may be small enough to maintain continuous cutting action at all times for proper guiding, and there will also be sufficient space between adjacent teeth in each longitudinal series for clearing chips because of the gaps.

While it is possible to provide the teeth as described on a solid broach, or an elongate sleeve (in the case of an externally toothed broach), or in pot broach rings of substantial axial extent, it is preferred to provide the teeth on relatively thin flat rings, so that each tooth may have an axial dimension such as to provide a plurality of resharpenings by face grinding, the gap between successive cutting teeth in each longitudinally extending series providing space for chip disposal.

Also, while it is possible to omit alternate teeth on each ring, it is preferred to provide tooth portions comprising a group of several adjacent teeth together with gaps accommodating the teeth of the aligned group.

For illustration, specific disclosure herein is made of a spur pot broach comprising a multiplicity of thin rings, each of which comprises circumferentially extending groups of several teeth separated to provide gaps of corresponding circumferential extent.

The holder in which the rings may be assembled to form a pot broach is disclosed in Bistrick, et al, U.S. Pat. No. 4,065,222.

BRIEF DESCRIPTION OF THE DRAWINGS

FIG. 4 is an enlarged fragmentary sectional view on the line 4—4, FIG. 2, showing the ring of FIG. 2 together with two succeeding rings in the series.
FIGS. 5-7, are diagrammatic views illustrating cut patterns on different broaches according to the present invention.

COMPLETE DESCRIPTION

Figure 1:
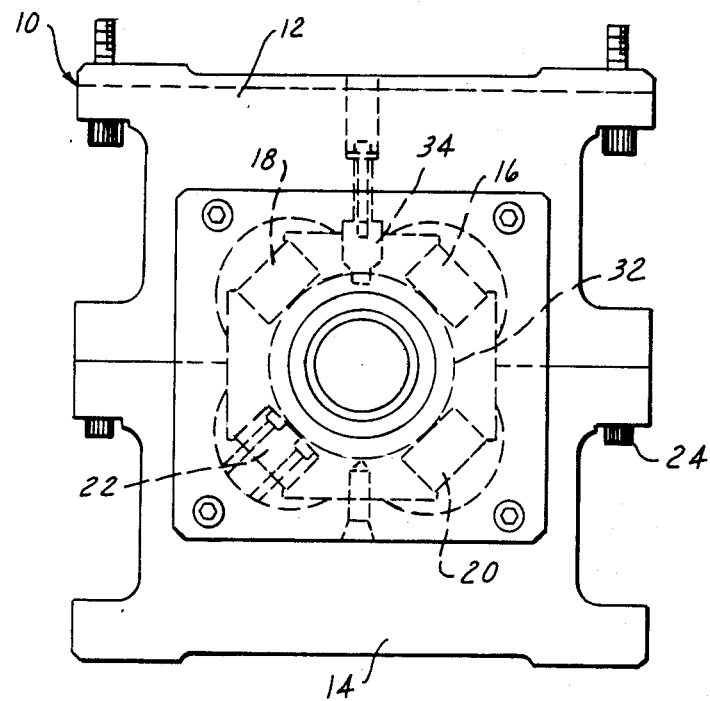
FIG. 1 is a fragmentary end elevation of a pot broach.

While the present invention is applicable to internally or externally toothed broaches for cutting spur or helical gears or splines, and may be solid or elongated shells for externally toothed broaches, the disclosure herein is of a pot broach for cutting thin externally toothed spur gears comprising thin, flat, internally toothed cutting rings or wafers assembled in solid side by side abutment.

These rings which will be described in detail, are assembled in an elongated holder 10 comprising trough shaped members 12 and 14. Trough 12 has locating bars 16–18.

Trough 14 has similar locating bars 20 and 22. Troughs 12 and 14 are secured together by screws 24. The outer cylindrical surfaces of broach rings 32 are clamped in place at four locations by bars 16, 18, 20 and 22. Trough 12 carries an axially extending keyway 34.

The broach rings are relatively thin, having a thickness as required by the thickness of the workpiece. The holder at one end has a annular abutment, not shown, against which one end of the assembly of rings abuts.

In a typical case, a thin circular workpiece is supported on a flat surface and is pushed through the pot broach, for example, upwardly. The support surface permits the workpiece to move laterally to position itself as determined by locating surfaces on the broach rings. In order for the workpiece to be at all times firmly supported on the pusher surface, the leading faces of a set of cutting teeth on one ring is followed by the leading faces of the set of cutting teeth on the adjacent ring at a distance such that the teeth on the adjacent ring commence cutting on the workpiece before the teeth on the other ring have completed their cuts.

Of course, it is possible to provide a succession of more than two adjacent rings, so that two or more adjacent rings are in cutting engagement with the workpiece at all times. This insures that the workpiece is at all times pressed firmly against the flat support or pushing surface.

Figure 3:
FIG. 3 is a section on the line 3—3, FIG. 2.
Figure 2:
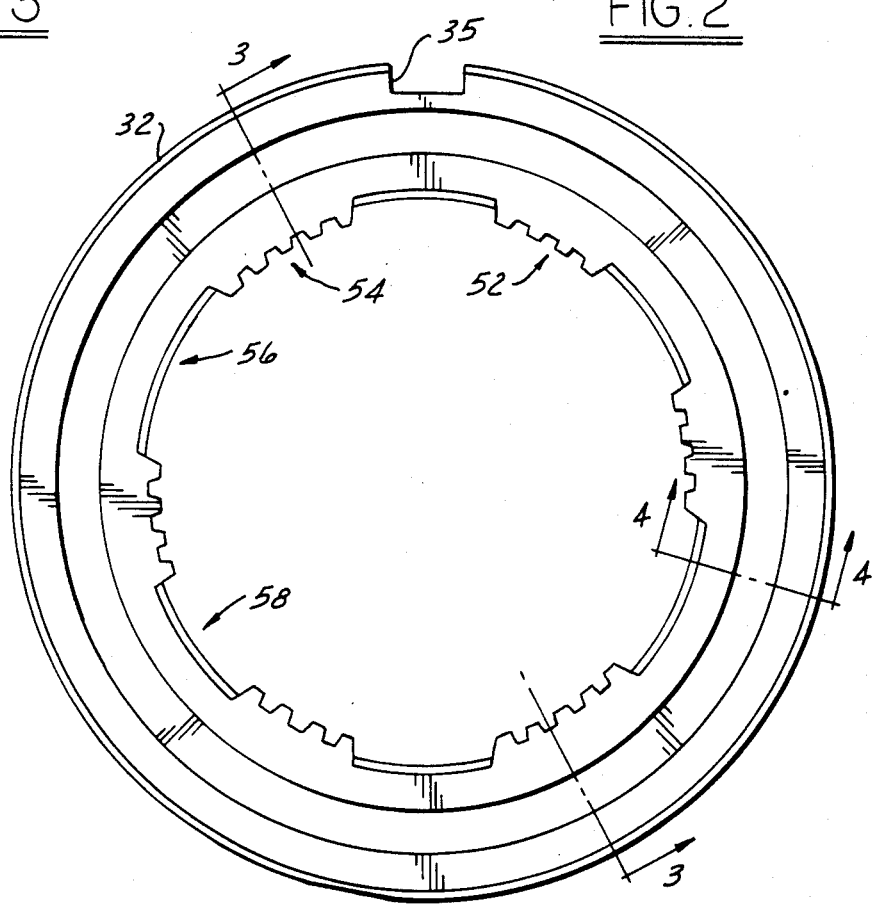
FIG. 2 is a end elevation of a broach ring.

Referring now to FIGS. 2 and 3, a single broach ring or wafer 32 is shown in detail. The ring has a smooth cylindrical outer surface interrupted by keyway 35, which serves to align the teeth of all rings into the longitudinally extending series previously described.

The particular broach ring shown herein is one of a set of one hundred and four having teeth designed to cut slots to form fifty two spline teeth on a thin workpiece having a flat surface engaged on a flat support or pusher surface. The broach pot is intended to be positioned in fixed position with its axis vertical. Relative axial movement between the broach and workpiece results from pushing the workpiece upwardly, but of course could result from vertical movement of the broach.

As best seen in FIG. 2, the set of teeth in one broach ring is in this example provided by arranging the teeth 50 in groups 52 of four teeth and groups 54 of five teeth. The groups are separated by gaps 56 having an arcuate dimension to correspond to five teeth of the preceding adjacent ring, and gaps 58 to correspond to four teeth of the preceding adjacent ring.

In FIG. 4, there is shown an enlarged fragmentary sectional view through three consecutive rings A, B, and C of a series. The teeth 50 of the individual rings A, B and C are initially identical, but are ground to have increasing radial height in the assembly, so that consecutive teeth of a series may take cuts at the bottom of a slot of about 0.0020". The teeth have inclined front faces 60 and top surfaces 62, the latter being inclined outwardly and rearwardly at an angle of about 1½°. The intersection of these surfaces forms the cutting edge 64 removes a chip from the bottom of a slot being cut. The tooth 50 of ring C is accordingly about 0.0020" higher than the preceding tooth 50 of ring A.

Ring B, in the sectional view of FIG. 4, has a gap, here indicated as gap 56, and serves to space the cutting edge 64 of ring C rearwardly from cutting edge 64 of ring A by a distance D which is twice the thickness T of an individual ring.

It will of course be appreciated that ring B of FIG. 4 will have teeth identical in height to either teeth 50 of rings A or C, whose cutting edges occupy a plane midway between the planes containing cutting edges 64 of rings A and C.

The front faces of the teeth 50 are inclined rearwardly to define gullets as shown. In addition, the bottom surfaces 66 of the gaps 56, 58 are inclined rearwardly and outwardly at an angle of about 15° to provide chip guide surfaces for chips cut by the follow ring.

Referring now to diagrammatic FIGS. 5-7, there is illustrated successive numbered cuts taken by successions of rings of specifically different arrangements of rings. It will be understood that for clarity, the depth of cut is greatly exaggerated, and in practice will approximate no more than about 0.0020".

In FIG. 5, a workpiece W to be broached is shown, which has a thickness less than the distance D between successive cutting edges 64. Alternate teeth of a cutting ring are omitted, so that the number of teeth in a group is one. Accordingly, in the next following ring, alternate teeth are omitted, and the tooth spaces are aligned in the series with teeth of the adjacent rings. In this case, the first ring will cut workpiece W to the depth indicated by lines 1 in slots F and H, and the following ring will cut to the same depth indicated by lines 2 in slots G and I. The third ring will cut to lines 3 in slots F and H, and the fourth ring will cut to lines 4 in slots G and I. The fifth and sixth rings will cut to lines 5 in slots F and H and lines 6 in slots G and I. In the actual broach a succession of one hundred and four rings are required to cut slots to full depth.

In FIG. 6, the same showing is made for a broach in which each group of teeth has two teeth, and gaps of the same arcuate extent are provided.

In FIG. 7, a similar diagram illustrates a sequence of cuts for a broach having three teeth in each group.

In use, when cutting teeth require sharpening, this is done by face grinding tooth surfaces 60 alternated with ID grinding surfaces 62, or sometimes both. Since successive teeth such as the teeth of rings A and C are separated by a ring such as B in FIG. 4, each tooth may have an extended axial dimension which permits a greater number of face grinds, which in turn, increases the tool life.

Although the workpiece W is thinner than the distance D, the teeth of two or more rings will at all times be in cutting contact for proper guiding. Also, because alternate rings provide gaps between teeth in each longitudinal series, adequate chip clearance is provided.

Accordingly, this invention provides (1) a narrow tooth pitch, (2) large chip clearance and (3) longer tooth lands for longer tool life.

We claim:

1. A broach having a multiplicity of cutting teeth arranged longitudinally extending series and in circumferentially extending sets, the teeth in each series being of increasing height from end to end to cut tooth spaces progressively deeper as a gear blank passes axially across said broach, the teeth in each set being arranged in circumferentially spaced groups of one or more teeth, the space between adjacent groups of teeth in each set being devoid of teeth, each group of teeth in one set being in longitudinal alignment with a space of at least equal circumferential extent in each of the next adjacent circumferentially extending sets of teeth.

2. A broach as defined in claim 1, in which each group of teeth comprises a plurality of teeth.

3. A broach as defined in claim 1, in which each group of teeth in one set is in longitudinal alignment with spaces in all other sets of teeth except those having teeth in longitudinal alignment with the groups of teeth in said one set.

4. A broach as defined in claim 1, in which the broach is a pot branch, and all of said teeth are internal teeth for cutting tooth spaces between teeth of an external gear.

5. A broach as defined in claim 1, in which said longitudinally extending series of teeth are straight and parallel to the axis of the broach for cutting spur gears.

6. A broach as defined in claim 1, in which the radially limiting surface of each of said spaces is inclined in axial section to constitute a chip guide for chips cut by the teeth of the next following group of teeth.

7. A broach as defined in claim 1, in which all of said teeth are provided in a multiplicity of flat rings abutted in side by side relation, and in which each ring is provided with all of the teeth of one of said circumferentially extending sets of teeth.

8. A broach as defined in claim 7, in which said rings are internally toothed to form a pot broach in assembly.

9. A broach having a multiplicity of cutting teeth arranged in longitudinally extending series and in circumferentially extending sets, the teeth in each set being arranged in circumferentially spaced groups of one or more teeth, the space between adjacent groups of teeth in each set being devoid of teeth, each group of teeth in one set being in longitudinal alignment with a space of at least equal circumferential extent in each of the next adjacent circumferentially extending sets of teeth.

* * * * *